May 2, 1961

C. M. PETERS ET AL 2,982,226

VALVES

Filed June 1, 1956

Clifford M. Peters
Robert W. Dinning
INVENTORS

BY

ATTORNEYS

May 2, 1961 C. M. PETERS ET AL 2,982,226
VALVES
Filed June 1, 1956 2 Sheets-Sheet 2

Clifford M. Peters
Robert W. Dinning
INVENTORS

BY
Browning, Simms & Hyer
ATTORNEYS

United States Patent Office 2,982,226
Patented May 2, 1961

2,982,226
VALVES

Clifford M. Peters and Robert W. Dinning, both of P.O. Box 2427, Longview, Tex.

Filed June 1, 1956, Ser. No. 588,745
11 Claims. (Cl. 103—233)

This invention relates to valves and more particularly to valves in which the valve member is substantially balanced, that is, either upstream or downstream pressure has little or no affect on opening or closing of the valve member even though the valve member reciprocates in the flow passageway.

In gas lift valves, the valve member reciprocates in the flow passageway through the valve. Thus, casing pressure and tubing pressure are normally effective on the valve member. As oil is lifted in the tubing, the tubing pressure on the valve decreases. Casing pressure will also vary while the valve is open. These two variables render it desirable in some cases, particularly in high volume valves, to balance the valve member so that the effect of either tubing or casing pressure is cancelled out. In this way, the valve will open and close only in accordance with changes in tubing or casing pressure depending upon whether the valve is operated by changes in casing pressure or tubing pressure.

This balancing feature has heretofore been provided by a piston exposed to casing and tubing pressure on opposite sides of the piston. The piston is connected to the valve member on the side opposite the means urging the valve toward its seat. The pressure surfaces of the piston and the valve member are reversed so that either tubing or casing pressure is balanced out depending upon the manner in which the valve is designed. The balancing piston heretofore used complicates the valve and makes it more expensive to manufacture.

In tubing pressure-operated, balanced piston valves, the passageway connecting the outlet from the valve to the inlet of the tubing has been in the side wall of the tubular valve body necessitating a special mandrel having annular seals above and below this side wall outlet. In valves designed for conventional mandrels, the outlet from the valve body is at one end so that a simple form of connection and seal may be provided between the valve body and mandrel. This is a much simpler, less expensive construction.

It is an object of this invention to provide a balanced pressure valve which is much simpler and less expensive than conventional balanced pressure valves.

Another object is to provide a valve in which pressure on one side of the valve seat does not substantially affect opening and closing of a valve member reciprocal in the flow passageway through the valve without the necessity of adding a separate balancing piston.

Another object is to provide a balanced pressure valve which opens and closes in response to changes in tubing pressure and which may be mounted in a conventional tubing mandrel.

Another object is to provide a balanced pressure valve in which the pressure drop is taken across a restricted portion of the passageway through the valve other than the valve seat to minimize cutting action of expanding gas on the valve seat.

Another object is to provide a gas lift system for lifting oil from a well in which gas is fed through the dumping valves at a much higher rate than through the working valve to rapidly unload the well and then efficiently produce the well.

Other objects, features and advantages of this invention will appear from the specification, drawings and the claims.

In the drawings wherein there is shown illustrative embodiments of this invention:

Valves constructed in accordance with this invention may be either casing operated or tubing operated. In the casing operated valve, tubing pressure has little or no affect on opening and closing of the valve member. In the tubing operated valve, casing pressure has little or no effect on opening and closing of the valve member. In each valve, a seal is provided on the valve stem and there is substantially no effective area on the valve member exposed to the non-controlling pressure.

Figure 1:
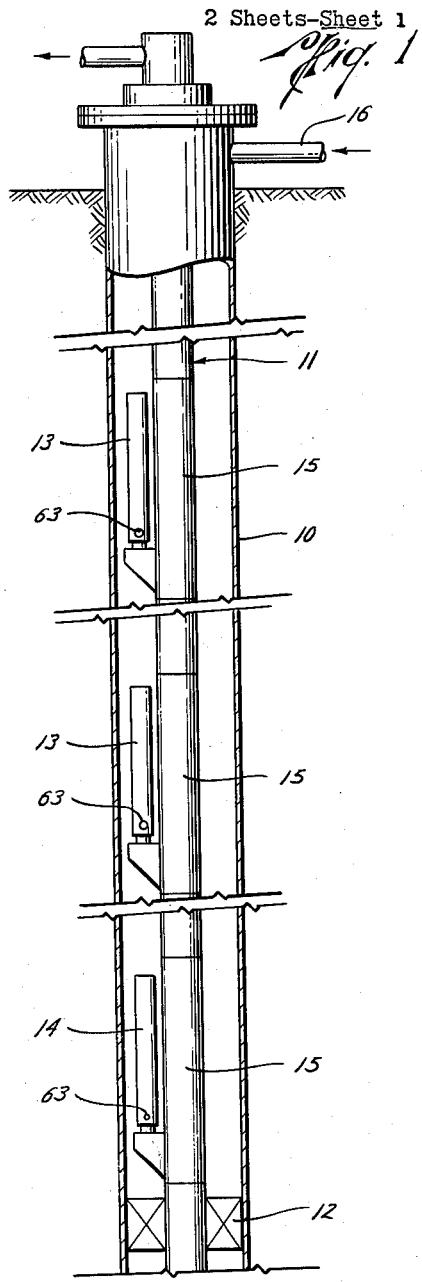
Fig. 1 is a view partly in vertical elevation and partly in vertical section through a well bore illustrating the system of this invention employing valves which open and close in response to changes in tubing pressure.

In the well bore illustrated in Fig. 1, strings of casing 10 and production tubing 11 are provided. The space between the casing and tubing is packed off by packer 12 above the producing formation (not shown). A plurality of dumping valves 13 and a lower working valve 14 are carried on the string of tubing by spaced conventional mandrels 15. Gas is injected into the casing annulus through conduit 16 and fed into tubing 15 through the several valves.

When the well is first placed on production, the tubing will normally be full of liquid and it is desired to dump the contents of the tubing and casing as rapidly as possible to quickly get on production. This hydrostatic head of fluid within the tubing must be removed before a differential can be established across the face of the oil sand and cause oil to flow into the well. In many cases it is desirable to place the well on production as soon as possible so that the well can make its allowable. In marginal wells, the rate of production may be so low that time is of the essence in obtaining the allowable for the well. For these and other reasons which make it desirable to place a well on production as rapidly as possible, the dumping valves 13 are provided with relatively large ports which permit large volumes of gas to be introduced into tubing 15 to rapidly remove the accumulated liquid therefrom. After the tubing has been dumped, however, it is desirable to regulate the rate at which gas flows into the tubing to produce the maximum amount of oil with a minimum volume of gas. Excessive gas gives an inefficient ratio of oil per unit of gas. An insufficient rate of flow will not provide a slug or piston of gas to lift oil in the tubing without excessive slippage and consequent reduced rate of recovery. Thus, the working valve port should be dimensioned to provide substantially the optimum rate of flow of gas into the tubing for the given well conditions.

Figure 2A:
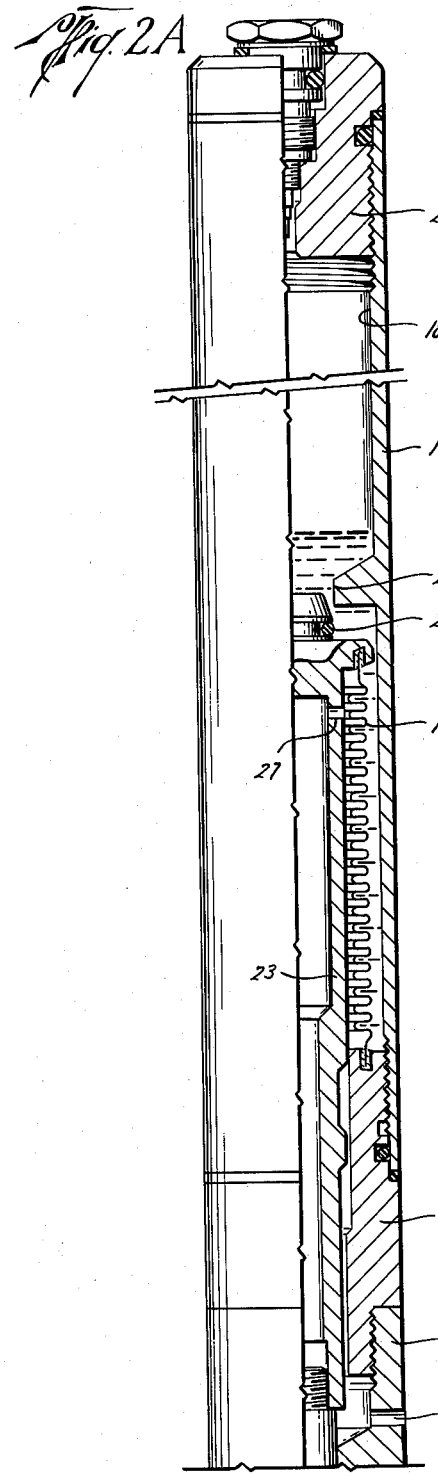
Fig. 2A is a view partly in elevation and partly in section of the head piece of a valve embodying this invention.

Referring now to Fig. 2A which illustrates a well known motor head for a gas lift valve, the body portion 17 of the head contains a pressure dome 18 which is formed in part by a bellows 19. The pressure dome is provided with a charging plug 20 at one end to permit charging of the bellows. The bellows is protected against excessive well pressure by trapping liquid behind the bellows as the valve member opens. As shown, the liquid level is above a seat 21 with which O-ring 22, carried by the bellows, forms a seal as the valve member moves to open position to trap a portion of the liquid behind the bellows to protect it against excessive pressure.

A guide 23 forms a part of a valve stem which interconnects the bellows with valve member 24.

Valve member 24 is provided by an elongated member 25, one end of which is connected to guide 23. The upper portion of member 25 above seal 26 may be considered a part of the valve stem and the lower portion below seal 26 may be considered a part of the valve member. Seal 26 is preferably a sliding seal and may be provided in any desired manner, such as by an O-ring preferably carried by the member 25 as shown.

The guide 23 is hollow and a port 27 establishes communication between the interior and the exterior of the guide. The area inside and outside of the hollow valve guide may be packed with grease to protect the bellows as is understood by those skilled in the art.

Figure 4:
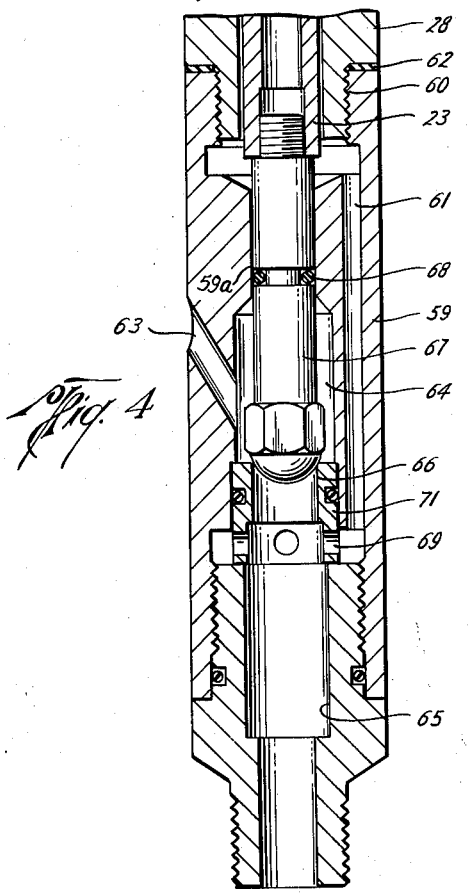
Fig. 4 is a view in cross-section through a form of foot piece to be used with the head piece shown in Fig. 2A to provide a valve operating in response to changes in tubing pressure.
Figure 2B:
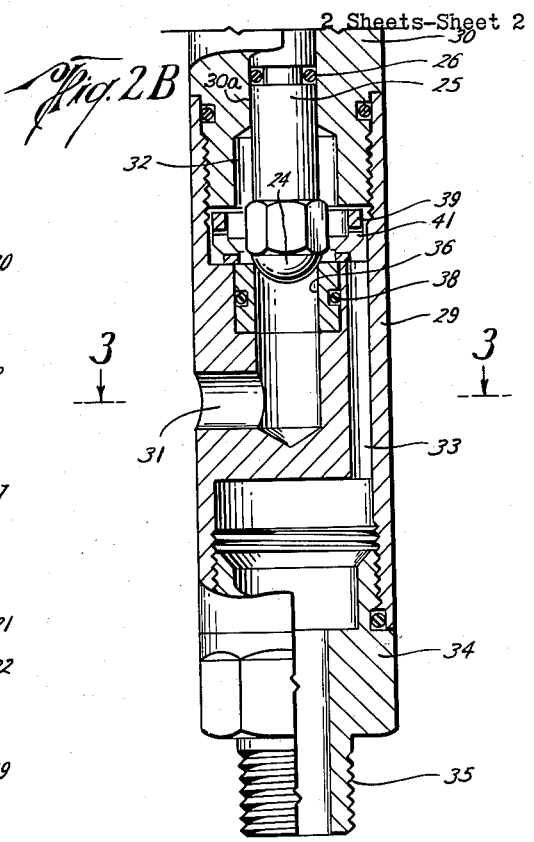
Fig. 2B is a continuation of Fig. 2A in cross-section illustrating a form of valve controlled by changes in casing pressure.
Figure 3:
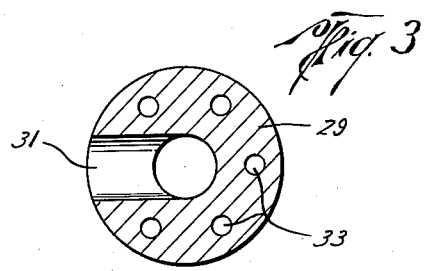
Fig. 3 is a view along the lines 3—3 of Fig. 2B.

The head may be considered to terminate in nipple 28 and in valve guide 23 as its design is such as to make-up with any of the lower valve foot parts shown in Fig. 2B and Fig. 4. The function of the valve head is to provide a resilient means urging the valve member of the foot piece toward closed position preferably by exerting a force on one side of a pressure responsive member such as bellows 19 which is exposed on its other side to either casing or tubing pressure which will appear more fully hereinafter. While a special general purpose motor is shown for each of the illustrated valves, it will be understood that any desired conventional form of motor may be used with this invention.

Referring now to Fig. 2B, the foot piece shown is used in wells where it is desired to control opening and closing of the valve by variation in casing pressure. The body 29 of the foot piece includes a connecting nipple 30 and is provided with a flow passageway therethrough for introducing gas from the casing into the tubing. This passageway includes an inlet passageway 31, a valve chamber 32, in which valve member 24 reciprocates, and a plurality of outlets 33 from the valve chamber 32. It will be noted that the outlet passageways 33 parallel a portion of inlet passageway 31. By providing for this reversal of direction of the flow passageway, a very simple form of balanced valve may be provided. Gas from the casing leaves passageways 33 and is introduced into the tubing through an adapter nipple 34. Nipple 34 has a male end 35 adapted to be connected to mandrel 15, or if desired, adapter nipple 34 may be connected to a check valve between the nipple and mandrel to prevent back flow of fluid from the tubing to the casing as is conventional practice in many installations.

Returning to the flow passageway, the sum of the cross-sectional area of the several portions 33 of the passageway is preferably less than the cross-sectional area of any portion of the passageway upstream thereof. Thus, with the valve open, substantially all of the pressure drop between casing and tubing pressure will be taken across passageway portions 33 and casing pressure will be present in inlet 31 and in valve chamber 32. In this way, casing pressure will always be exerted upon the valve member 24 and the effect of the drop between casing and tubing pressure which occurs in the conventional valve at the valve seat, will not affect the opening and closing pressure of the valve member.

To insure that tubing pressure does not affect opening and closing of the valve member and that the effective area of the valve member exposed to casing pressure will be the same with the valve member both in open and closed position, the area of the valve seat 36 can be equal to the cross-sectional area within sliding seal 26. For the specific structure shown in Fig. 2B, this cross-sectional area within the sliding seal 26 will be equal to the cross-sectional area of bore 30a through connecting nipple 30 and, therefore, stated in another manner, the cross-sectional area of the valve seat is made equal to the cross-sectional area of bore 30a. Therefore, with the seat area being equal to the area of bore 30a and with the valve closed, there will be no net effective area on the valve member or stem against which tubing or valve outlet pressure in chamber 32 can act to effectively urge the valve toward either open or closed position. Stated in another manner, all endwise facing areas on the valve member and stem between seal 26 and seat 36 will have equal and oppositely facing counterparts so that any endwise force resulting from tubing pressure acting on one such area will be counterbalanced by the same tubing pressure acting on an equal but oppositely facing area. This is by virtue of making the seat and seal areas equal. Once the valve member is unseated, casing pressure is present in valve chamber 32 and is effective on the valve member over an area equal to that within sliding seal 26. Stated in another manner, upon opening of the valve, pressure in chamber 32 changes from tubing pressure to substantially casing pressure because, as stated, passageway portions 33 are sized so that substantially all of the pressure drop between the casing and tubing is taken across these passageway portions and since chamber 32 is upstream thereof, the pressure in chamber 32 will rise to substantially that of the casing. Hence with the valve closed, casing pressure acts on the area of the valve member 24 within seat 36 to urge the valve open, and with the valve open, casing pressure in chamber 32 still acts on an equal area to urge the valve member open. Thus, the effect of casing pressure on the valve member is the same with the valve member in open or closed position.

If it is desired to open the valve rapidly, the area within the sliding seal may be slightly larger than the area of the valve seat so that casing pressure will act on a larger area upon opening of the valve member to cause it to snap to open position. This difference would be so small that the areas would be substantially equal and only a slight increase in the amount of bleed down of casing pressure to reseat the valve would be necessary.

In order that the pressure upstream of the valve seat, that is the pressure effective on the valve member also be effective on the bellows 19, the connecting nipple 30 is provided with a passageway 37 exposing the bellows to the same pressure to which the end of the valve member is exposed. As casing or ambient pressure will be the same about the body of the valve, the passageway 37 may open into the exterior of the body and the bellows 19 will be subject to the same pressure that exists in inlet 31.

Recapitulating with the valve closed, (a) the tubing pressure is ineffective to open or close the valve no matter what value it may have, (b) the casing pressure acts to urge the valve open by acting on (1) the area of the valve member within seat 36 plus (2) the net annular area equal to the cross-sectional area of the bellows minus the area within seal 26, and (c) the charge pressure in dome 18 acts to urge the valve closed by acting on an area equal to the cross-sectional area of the bellows.

With the valve open, (d) the tubing pressure is still ineffective because it is isolated from all moving parts of the valve and casing pressure exists in chamber 32, (e) the casing pressure still acts on the same areas as outlined in item (b) above, and (f) the charge pressure still acts on the same areas as outlined in item (c) above.

Valve seat 36 can be of the removable type as shown and a seal such as O-ring 38 provided between the seat and body 29. A cage 39 fits about the valve member and provides a spacer between the valve seat 36 and the end of connector nipple 30 to hold the valve seat in place after the valve seat is assembled. The cage 39 is provided with a plurality of ports 41 to permit free flow therethrough.

With its large flow passageway and the effect of tubing back pressure cancelled, the valve of Fig. 2B is particularly well adapted for intermitting service in low productivity wells and most especially in deep wells. The large flow passageway permits the valve to "slug" or lift fluid from extreme depths with maximum efficiency and minimum slippage. The main inlet gas port 31 in a commercial form of the valve is one-half inch in diameter and provides for a large volume of gas to be introduced into the tubing.

In explaining the operation of the valve of Fig. 2B, it will be assumed that the valve is a working valve and the casing 10 and tubing 11 have previously been cleared of liquid and the well is on normal production. The valve will be closed and a controller (not shown) will build up pressure within the casing to where the casing pressure exerts a force on the valve member and bellows 19 in excess of the force exerted in the pressure dome on bellows 19 and the valve member will open. As tubing pressure has been balanced out, it will not affect the opening of the valve member. As the valve member 24 is unseated, gas will flow through the flow passageway provided by inlet 31, valve chamber 32 and outlet passageways 33 into the tubing. As the flow passageway is of large area, a large volume of gas will be introduced into the tubing which will lift the column of fluid above the working valve of the tubing. As casing pressure drops, the force exerted by casing pressure on the bellows 19 and valve member 24 will be reduced to a value less than that exerted by the pressure within dome 18 and valve member 24 will be reseated. As the effective area of valve member 24 is the same with the valve open or closed, that is the area of seal 26, the valve member will close with minimum bleed down of casing pressure.

Referring now to Fig. 4, there is shown a form of valve which operates in response to changes in tubing pressure and which may be mounted on a standard mandrel.

In this valve, casing pressure has no effect on the opening and closing characteristics of the valve. Again, the valve can be made-up by combining the special foot shown in Fig. 4 with the head piece of Fig. 2A. For this purpose, the body 59 of the foot piece is provided with an upper end 60 which may be secured to connector nipple 28 of the head of Fig. 2A as shown. The bellows is exposed to tubing pressure through one or more passageways 61 in body 59. To confine this tubing pressure, a seal member 62 is interposed between the body 59 and connector nipple 28.

The valve foot is provided with a flow passageway therethrough by restricted inlet 63, valve chamber 64 and outlet 65. The restricted inlet 63 is smaller than any other portion of the flow passageway and is smaller than the valve seat 66 with which the valve member 67, reciprocating in chamber 64, cooperates to control flow through the flow passageway.

Again, a seal means such as sliding seal 68 is provided between the valve stem and body and has an effective seal area equal to the area of valve seat 66. For the specific structure shown, the effective seal area is equal to the cross-sectional area of bore 59a. As these two areas are equal, each portion of the valve member which is exposed to pressure has an equal and opposite surface on which pressure within the valve chamber may act excepting the end of the valve member which is within the seat 66 when the valve is closed.

In operation, the desired pressure is maintained within the casing annulus and the valve kicks or opens when the hydrostatic head of fluid within the tubing exerts a predetermined opening force on the end of the valve member 67 and on bellows 19. While the valve is closed, tubing pressure is exerted on the end of the valve member 67 within valve seat 66 and on bellows 19 through passageway 61. Communication between passageway 61 and the flow passageway on the downstream side of seat 66 is provided by one or more passageways 69 in seat insert 71. Casing pressure within valve chamber 64 is exerted on equal and opposite areas on valve member 67. As there is no effective area for casing pressure to act on, casing pressure has no affect on the opening and closing characteristics of the valve member. As soon as a head of fluid has accumulated in the tubing sufficient to exert a force greater than the force exerted by the pressure within dome 18, valve member 67 will move toward open position and permit flow of gas from the casing into the tubing to lift the head of fluid therein. As gas flow is restricted through inlet 63, the pressure drop between casing and tubing pressure will take place at this point and tubing pressure will be present within valve chamber 64 while the valve is open. With the valve open the effective area of the valve member exposed to tubing pressure is the area of sliding seal 68. As this area is equal to the area of the valve seat, the effective area of the valve member exposed to tubing pressure both while open and closed is the same. As the pressure exerted by the hydrostatic head within the tubing drops below the pressure within dome 18, the valve member 67 will re-seat and permit the hydrostatic head within the tubing to again build up.

From the above, it will be seen that the objects of this invention have been attained. There has been provided a very simple rugged form of balanced valve which eliminates the necessity for the addition of a balancing piston to the valve member. Such a valve has been provided which may be controlled by changes in either casing pressure or tubing pressure to permit control of the well by varying casing pressure or permitting the well itself to kick or open the valve as soon as a suitable column of fluid has been collected above the working valve.

The pressure drop between casing and tubing pressure is taken at a point other than the valve seat which minimizes the cutting action of the gas on the valve seat.

The tubing operated form of valve shown in Fig. 4 is so designed so that it may be mounted in a conventional mandrel eliminating the necessity for a special and more expensive mandrel to mount the valve on a tubing string as has been conventional practice in the past. The valve may also be run on a wire line and landed in chamber equipment such as shown at page 1897 of the 21st edition of Composite Catalog of Oil Field and Pipeline Equipment, and in side pocket mandrels as shown at page 995 of the 20th edition of the same work.

There has also been provided a system for gas lift operation which will quickly unload, and then efficiently produce a well.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a well system including first and second well conduits disposed in a well bore, a gas lift valve system comprising a plurality of upper pressure actuated dumping valves and a lower pressure actuated working valve mounted on the first conduit, said valves being opened and closed by an increase and decrease of pressure within the first conduit, each of said valves having means for balancing out the effect of pressure in the second conduit on the valve member and a restricted inlet of less cross-sectional area than the valve seat so that the pressure drop between the first and second conduits is taken at the inlet and pressure in the second conduit has no effect on opening and closing of the valves, the inlets of the dumping valves having a greater cross-sectional area than the inlet of the working valve to provide for rapid unloading through the dumping valves and efficient production utilizing the working valve.

2. In a well system including a well tubing and casing spacedly surrounding said well tubing disposed in a well bore, a gas lift valve system comprising a plurality of upper pressure actuated dumping valves and a lower pressure actuated working valve mounted on the tubing, each of said valves comprising a body having a flow passageway therethrough communicating between the tubing and casing, a valve seat across the passageway, a valve member including a stem mounted for reciprocation in the passageway and cooperable with the seat to control flow through the passageway, means controlling seating and unseating of the valve member including resilient means urging the valve member toward valve closing position and a pressure responsive member in the body connected to the valve member by said valve stem, passageway means exposing the pressure responsive member to the pressure in the flow passageway on the tubing side of the valve seat to urge the valve member away from its seat, a seal between the valve stem and body intermediate the pressure responsive member and the valve seat and preventing fluid flow along the valve stem, said valve member having a cross-sectional area within the seat which is equal to the effective cross-sectional area within said seal so that pressure on the casing side of the valve seat will have substantially no effect on operation of the valve, and a restriction in the flow passageway on the casing side of the valve seat of smaller cross-sectional area than the valve seat limiting pressure on the valve member when unseated to tubing pressure, said restriction being of less cross-sectional area on the working valve than on the dumping valves.

3. A valve comprising a body having a connector at one end for connection with a flow tubing, a flow passageway through the body having an inlet at the exterior of the body and an outlet at said connector, a valve seat across the passageway, a valve member including a stem mounted for reciprocation in the passageway and cooperable with the seat to control flow through the passageway, said seat being disposed transversely of the valve member so that pressure on one side of the seat acts upon the area of the valve member within the seat to urge the valve member toward unseated position, means controlling seating and unseating of the valve member including resilient means urging the valve member toward valve closing position with predetermined force and a pressure responsive member in the body connected to the valve member by said valve stem, passageway means in the valve exposing one side of the pressure responsive member to the pressure in the flow passageway on said one side of the valve seat to urge the valve member away from its seat, a seal between the valve stem and body intermediate the valve seat and pressure responsive member and preventing fluid flow along the valve stem, the effective cross-sectional area of said valve member within said seat when the valve member is seated therein being substantially equal to the effective area within said seal substantially balancing pressure from fluid on the other side of the valve seat on equal areas of the stem, seal and valve closure member in opposite directions when the valve is seated, whereby pressure on said other side of the valve seat has substantially no effect on operation of the valve.

4. A valve comprising a body having a connector at one end for connection with a flow tubing, a flow passageway through the body having an inlet at the exterior of the body and an outlet at said connector, a valve seat across the passageway, a valve member including a stem mounted for reciprocation in the passageway and cooperable with the seat to control flow through the passageway, said seat being disposed transversely of the valve member so that pressure on one side of the seat acts upon the area of the valve member within the seat to urge the valve member toward unseated position, means controlling seating and unseating of the valve member including resilient means urging the valve member toward valve closing position with predetermined force and a pressure responsive member in the body connected to the valve member by said valve stem, passageway means in the valve exposing the pressure responsive member to the pressure in the flow passageway on said one side of the valve seat to urge the valve member away from its seat, means forming a sliding seal between the valve stem and body intermediate the valve seat and pressure responsive member and preventing fluid flow along the valve stem, the effective area of said valve member within said seat when the valve member is seated therein being equal to the effective area within said seal means substantially balancing pressure from fluid on the other side of the valve seat on equal areas of the stem, seal and valve closure member in opposite directions when the valve is seated so that pressure on the other side of the valve seat will have substantially no effect on operation of the valve, and a restriction in the flow passageway on said other side of the valve seat of smaller cross-sectional area than that of the valve seat limiting pressure on the valve member when unseated to pressure on said one side of the valve seat.

5. A valve comprising a tubular body having a connector at one end for connection with a flow tubing, a flow passageway through the body with its outlet at the connector and its inlet in the sidewall of the body, said passageway having parallel inlet and outlet portions interconnected by a valve chamber, a valve seat at the entrance of the inlet passageway portion to the chamber, a valve member reciprocal in the chamber and cooperable with the seat to control flow through the passageway, a pressure dome in the other end of the body formed in part by a pressure responsive member, a valve stem interconnecting the pressure responsive member and the valve member, a sliding seal between the body and valve stem preventing flow to and from the chamber along the valve stem, the area within the sliding seal being equal to the area of the valve seat so that pressure within the chamber will not exert a force on the valve member effective to move it when the valve is closed, and passageway means in the valve exposing the pressure responsive member and the valve stem on the end remote from the chamber to ambient pressure.

6. A valve comprising a tubular body having a connector at one end for connection with a flow tubing, a flow passageway through the body with its outlet at the connector and its inlet in the side wall of the body, said passageway having parallel inlet and outlet portions interconnected by a valve chamber, a valve seat at the entrance of the inlet passageway portion to the chamber and disposed transversely of the valve member so that pressure on the upstream side of the seat acts upon the area of the valve member within the seat to urge the valve member toward unseated position, a valve member reciprocal in the chamber and cooperable with the valve seat to control flow through the passageway, a pressure dome in the other end of the body formed in part by a pressure responsive member, a valve stem interconnecting the pressure responsive member and the valve member, a sliding seal between the body and valve stem preventing flow to and from the chamber along the valve stem, the area within the sliding seal being equal to the area of the valve seat and all areas on the valve closure member, stem and seal on the side of the seat toward the seal being balanced by equal and opposite areas so that pressure within the chamber will not exert a force on the valve member effective to move it when the valve is closed, passageway means in the valve exposing the pressure responsive member and the valve stem on the end remote from the chamber to ambient pressure, and a restriction in the passageway downstream of the valve seat of smaller cross-sectional area than that of the valve seat limiting pressure on the valve member when unseated to pressure upstream of the seat.

7. A valve comprising a body having a connector at one end for connection with a flow tubing, a flow passageway through the body having an inlet at the exterior of the body and an outlet at the connector, a valve seat across the passageway, a valve member mounted on the downstream side of the seat for reciprocation in the passageway and cooperable with the seat to control flow through the passageway, said seat being disposed transversely of the valve member so that upstream pressure, when the valve member is seated, acts to urge the valve member to unseated position, a pressure responsive member in the body, a valve stem connected to the valve member and pressure responsive member, resilient means acting on one side of the pressure responsive member urging it toward valve closing position with predetermined force, a passageway between the interior and exterior of the body exposing the other side of the pressure responsive member to the pressure exterior of the body, a sliding seal between the valve stem and body and situated intermediate the pressure responsive member and valve seat and preventing fluid flow along the valve stem, the effective area within said sliding seal being equal to the area within the valve seat so that said valve member when seated has equal and opposite areas exposed to downstream pressure so that such downstream pressure will have no effect upon unseating of the valve, and a restriction in the flow passageway on the downstream side of the valve seat of smaller cross-sectional area than the valve seat so that upstream pressure will be effective on the valve member in both open and closed positions.

8. A valve comprising a body having a connector at one end for connection with a flow tubing, a flow passageway through the valve body having an inlet at the exterior of the body and an outlet at said connector, a valve seat across the passageway, a valve member including a stem mounted for reciprocation in the passageway upstream of the seat and cooperable with the seat to control flow through the passageway, said valve seat being disposed transversely of the valve member so that pressure downstream of the seat, when the valve member is seated, acts to urge the valve member to unseated position, a pressure responsive member in the body connected to the valve member by said valve stem, resilient means acting on one side of the pressure responsive member urging it toward valve closing position with predetermined force, passageway means in the valve exposing the other side of the pressure responsive member to pressure on the downstream side of the valve seat, a sliding seal between the valve stem and body and situated intermediate the pressure responsive member and seat and preventing fluid flow along the valve stem, the effective area within said sliding seal being equal to the area of the valve seat whereby pressure upstream of the valve seat will not affect the valve member when seated, and a restriction in the flow passageway upstream of the valve seat of smaller cross-sectional area than the valve seat so that downstream pressure will be effective on the valve member both in its open and closed positions.

9. A valve comprising a body having a connector at one end for connecting to a flow tubing; a flow passageway through the body comprising sequentially an inlet section, an enlarged valve chamber within the body, and an outlet section, one of said inlet and outlet sections having effectively larger total cross-sectional area than the other, one of said sections communicating with the interior of said flow tubing through the connector and the other communicating with the exterior of said body; a valve seat having an internal cross-sectional area substantially equal to the cross-sectional area of the larger of said inlet and outlet sections disposed around the larger of said sections adjacent to said valve chamber; a valve stem disposed for reciprocating movement in the valve chamber and in a bore in the body communicating therewith; a valve closure member carried on said valve stem in the valve chamber and cooperable with said valve seat to open and close the flow passageway; means controlling seating and unseating the valve member, including a pressure responsive member in the body connected to the valve stem and resilient means for applying predetermined force to the pressure responsive member urging the valve member toward valve closing position; a passageway in the valve disposed to apply pressure substantially equal to pressure in the larger of said inlet and outlet sections to a surface of the pressure responsive member in a direction opposing said predetermined force; and a sliding seal between the valve stem and body disposed in said bore intermediate the valve seat and pressure responsive member to prevent fluid flow along the valve stem, the area within said seal being substantially equal to the area of said valve member within said seat when the valve member is seated, substantially balancing pressure from fluid in the valve chamber on areas of the valve closure member and stem in opposite directions when the valve is seated whereby pressure in the valve chamber has substantially no effect in opening the valve.

10. A valve comprising a body having a connector at one end for connection to a flow tubing; a flow passageway through the body comprising sequentially an inlet section, an enlarged valve chamber within the body and an outlet section, said inlet section having effectively larger total cross-sectional area than the outlet section, the outlet section communicating with the interior of said flow tubing through the connector and the inlet section communicating with the exterior of the body; a valve seat having an internal cross-sectional area substantially equal to the cross-sectional area of the inlet section disposed around the inlet section adjacent to said valve chamber; a valve stem disposed for reciprocating movement in the valve chamber and in a bore in the body communicating therewith; a valve closure member carried on said valve stem in the valve chamber cooperable with said valve seat to open and close the flow passageway; means controlling seating and unseating the valve member, including a pressure responsive member in the body connected to the valve stem and resilient means for applying predetermined force to the pressure responsive member urging the valve member toward valve closing position; a passageway in the body disposed to apply pressure substantially equal to pressure in the inlet section to a surface of the pressure responsive member in a direction opposing said predetermined force; a sliding seal carried by the valve stem disposed in said bore intermediate the valve seat and pressure responsive member to prevent fluid flow along the valve stem through the bore, the area within said seal being substantially equal to the effective area of said valve member within said seat when the valve member is seated, substantially balancing pressure from fluid in the valve chamber on areas of the valve closure member, stem and seal in opposite directions when the valve is seated whereby pressure in the valve chamber has substantially no effect in opening the valve.

11. A valve comprising a body having a connector at one end for connection to a flow tubing; a flow passageway through the body comprising sequentially an inlet section, an enlarged valve chamber within the body, and an outlet section, said inlet section having effectively smaller cross-sectional area than the cross-sectional area of the outlet section and communicating with a space exterior of said flow tubing and said body, said outlet section communicating with the interior of said flow tubing through said connection; a valve seat having an internal cross-sectional area substantially equal to the cross-sectional area of the outlet section disposed around the outlet section adjacent to said valve chamber; a valve stem disposed for reciprocating movement in the valve chamber and in a bore in a body communicating therewith; a valve closure member carried on said valve stem in the valve chamber cooperable with said valve seat to open and close the flow passageway; means controlling seating and unseating the valve member, including a pressure responsive member in the body connected to the valve stem and resilient means for applying predetermined force to the pressure responsive member urging the valve member toward valve closing position; a passageway in the body disposed to apply pressure substantially equal to pressure in the outlet section to a surface of the pressure responsive member in a direction opposing said predetermined force; and a sliding seal carried by the valve stem disposed in said bore to seal between the valve stem and body intermediate the valve seat and pressure responsive member to prevent fluid flow along the valve stem, the effective area within said seal being substantially equal to the effective area within said seat when the valve member is seated, substantially balancing pressure from fluid in the valve chamber on opposing areas of the valve closure member, stem and seal in opposite directions when the valve is seated whereby pressure in the valve chamber has substantially no effect on operation of the valve.

References Cited in the file of this patent

UNITED STATES PATENTS

| | | |
|---|---|---|
| Re. 24,015 | Walton | May 31, 1955 |
| 2,314,869 | Boynton | Mar. 30, 1943 |
| 2,339,487 | King | Jan. 18, 1944 |
| 2,620,740 | Garrett et al. | Dec. 9, 1952 |
| 2,620,741 | Garrett et al. | Dec. 9, 1952 |
| 2,629,335 | Peters | Feb. 24, 1953 |
| 2,642,811 | Fletcher | June 23, 1953 |
| 2,691,383 | Church | Oct. 21, 1954 |
| 2,698,024 | Canalizo | Dec. 28, 1954 |
| 2,725,014 | Pryor | Nov. 29, 1955 |
| 2,731,977 | McGowen | Jan. 24, 1956 |
| 2,797,700 | McGowen | July 2, 1957 |